United States Patent [19]

Suter

[11] Patent Number: 5,025,425

[45] Date of Patent: Jun. 18, 1991

[54] SONIC DETECTION AND TRACKING SYSTEM

[75] Inventor: Henry Suter, Hatboro, Pa.

[73] Assignee: The United States of America as represented by the Secretary of the Navy, Washington, D.C.

[21] Appl. No.: 43,616

[22] Filed: Apr. 30, 1970

[51] Int. Cl.$^5$ .............................................. G01S 15/00
[52] U.S. Cl. ...................................... 367/96; 367/104
[58] Field of Search ............ 340/3 R, 3 D, 1 R, 16 C, 340/258 A; 367/95, 96, 104, 904

[56] References Cited

U.S. PATENT DOCUMENTS

| | | | |
|---|---|---|---|
| 2,372,620 | 3/1945 | Williams | 342/33 |
| 2,416,562 | 2/1947 | Alexanderson | 342/75 |
| 2,438,580 | 3/1948 | Schuck | 367/904 |
| 2,743,429 | 4/1956 | Erdman et al. | 367/96 |
| 2,859,433 | 11/1958 | Saxton et al. | 367/904 |
| 2,871,459 | 1/1959 | Berry | 367/104 |
| 2,964,729 | 12/1960 | Beebe et al. | 367/95 |
| 3,320,577 | 5/1967 | Wright | 367/138 |

Primary Examiner—Thomas H. Tarcza
Assistant Examiner—Daniel T. Pihulic
Attorney, Agent, or Firm—James V. Tura; James B. Bechtel; Susan E. Verona

[57] ABSTRACT

Two submerged rotatable sets of transmitting and receiving transducers are longitudinally spaced along the side of a river to establish intersecting lateral sonar beams obliquely oriented at opposing 45° angles relative to the primary river current. Each beam can be slewed in opposite directions through 45° to parallel orientation with the current. The outputs of the transducer arrays are passed to respective doppler sonar detection units which produce alarm output signals when the normalized doppler frequency shift within at least one of a plurality of narrow frequency bands in each unit exceeds a predetermined level. The transmitting frequency of each array is varied with rotation of the array. If only one beam detects a target, a control circuit causes the other beam to slew until it acquires the target. With detection by both beams, the position of the target can be computed from the bearing angles of the arrays.

5 Claims, 3 Drawing Sheets

SONIC DETECTION AND TRACKING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to improved underwater detection systems, and more particularly to a doppler sonar system employing intersecting, rotatable beams for detecting and tracking targets in flowing water.

Sound energy transmitted through a moving medium and reflected from a stationary object along the same path to a receiver located near the transmitter will experience no significant frequency shift since the doppler effects of the moving medium cancel out during transit in opposite directions. However, if the reflecting surface, for instance, an air-water boundary or floating particulate matter, is approaching relative to the transmitter-receiver array, the received sonic waves will contain doppler-shifted frequencies somewhat higher than the original transmitted frequency. Flowing water in a river normally exhibits certain discontinuities which form moving reflective surfaces and account for an ambient doppler spectra in the absence of target objects.

In the past, doppler sonar systems have been used in rivers to guard against sabotage of river installations by detecting the approach of swimming or floating objects. One type of equipment uses adjacent narrow bandpass filters to monitor the amplitudes of doppler shifts within certain frequency bands. The presence of an intruder swimming or floating downstream causes the amplitude to increase from the ambient level characteristic of the river current to an alarm level within one or more affected filters. The prior system employed a single pair of directional transducers which were mounted at the side of a river and oriented at a fixed angle to the primary current to provide a narrow-beam acoustic fence. While the beam position determined the bearing of a detected target, the prior device was not intended to provide ranging capability. Without range information, however, effective deployment of destructive countermeasures has been hindered especially at times of limited visibility. Moreover, since the beam was fixed, the indicated bearing would only be true at the moment of detection.

Using a single rotating or slewing array to update the bearing angle was not sufficient since range information would still be lacking. Moreover, downstream rotation of the single beam caused a nonlinear variation in the received frequencies since the doppler shift was a function of the cosine of the beam angle relative to the river current. Because of the resultant change in the ambient spectra, accurate detection with a rotating array of constant frequency would have required rapid, continuous adjustment of the alarm levels within the filtered bands.

SUMMARY OF THE INVENTION

Accordingly, one of the objects of the invention is to improve the prior doppler detection device by automatically providing target coordinate information at the time of detection. Another object of the invention is to provide continuous tracking and readout of the target coordinate information following initial detection. A further object of the invention is to make the doppler frequency independent of the sonar beam orientation relative to the current.

These and other objects of the invention are achieved by providing two rotatable arrays of transmitting and receiving transducers longitudinally spaced along the side of a river to establish intersecting lateral sonar beams obliquely oriented at opposing 45° angles relative to the primary river current. Each beam can be slewed in opposite directions through 45° to parallel orientation with the current. The output of each transducer array is passed to a respective doppler sonar detection unit which produces an alarm output signal when the normalized doppler frequency shift within at least one of a plurality of narrow frequency bands exceeds a predetermined level. The transmitting frequency of each array is varied with rotation of the array. If only one beam detects a target, a control circuit causes the other beam to slew until it detects the target. With simultaneous detection by both beams, the position of the target can be computed from the bearing angles of the arrays.

DESCRIPTION OF THE PREFERRED EMBODIMENT

Figure 1:
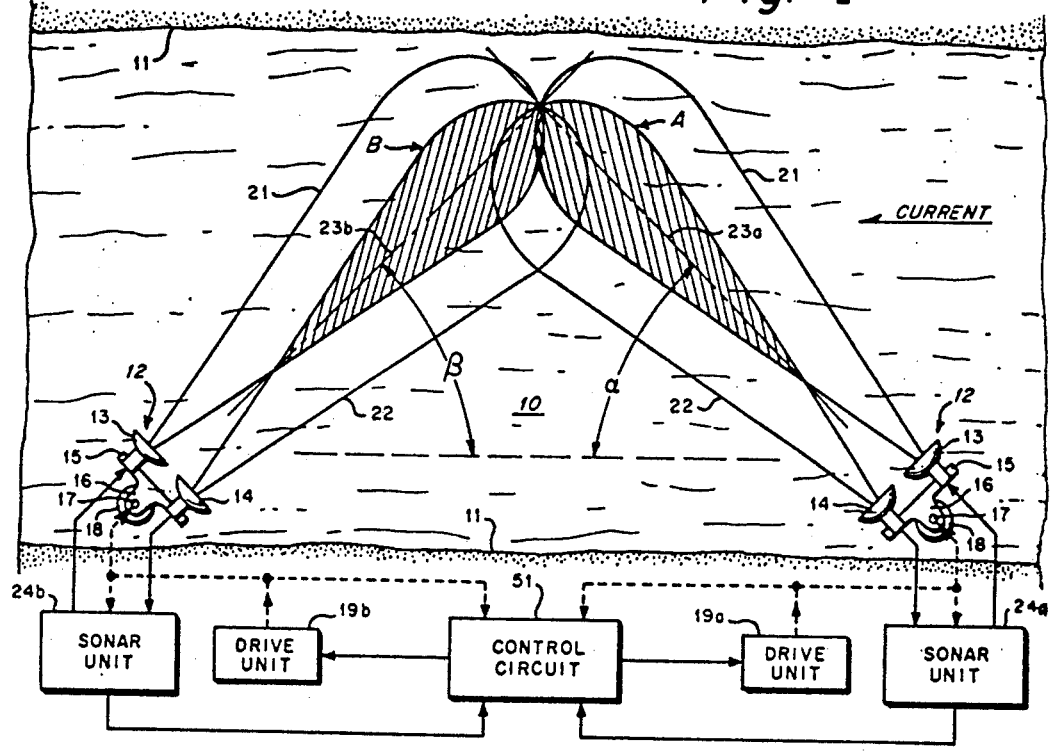
FIG. 1 is a plan view and block diagram of a sonic detection and tracking system according to the invention.

Referring to FIG. 1, a river 10 with current flowing from right to left is defined by banks 11. Implanted at different locations along one side of river 10 are two submerged transducer arrays 12 each including a directional, continuous-wave acoustic generator 13 and a directional acoustic receiver 14. Each array 12 may comprise a matched pair of piezoelectric or magnetostrictive transducer elements with parabolic reflectors. The transducer elements should have constant output characteristics throughout the required frequency ranges. Each array 12 is mounted on a respective table 15 which is connected to a swivel joint 16 with a rotational axis 17 and supported at the side wall of river 10 by a piling 18. Drive units 19a and 19b pivot the corresponding tables 15 about axes 17, through suitable linkages, in a rotational plane substantially parallel to the water surface. Ordinary reversible electric motors would be suitable for units 19a and 19b, which are referred to generically as unit 19.

Each generator 13 projects an elongated volumetric beam 21 ensonifying a portion of the river. Similar beams 22 represent the volumes from which sound energy is received by receivers 14. Beams 21 and 22 from each array 12 define overlapping regions of beams A and B, with respective axes 23a and 23b, within which reflected sonic waves originating from each generator 13 are detected by the corresponding receiver 14. By means of drive unit 19a, axis 23a is rotatable counterclockwise from an angle α of 45° to approximately 0° relative to the current. Likewise, axis 23b may be slewed clockwise by drive unit 19b through 45° from its normal angle β of 45° relative to the current.

Figure 2:
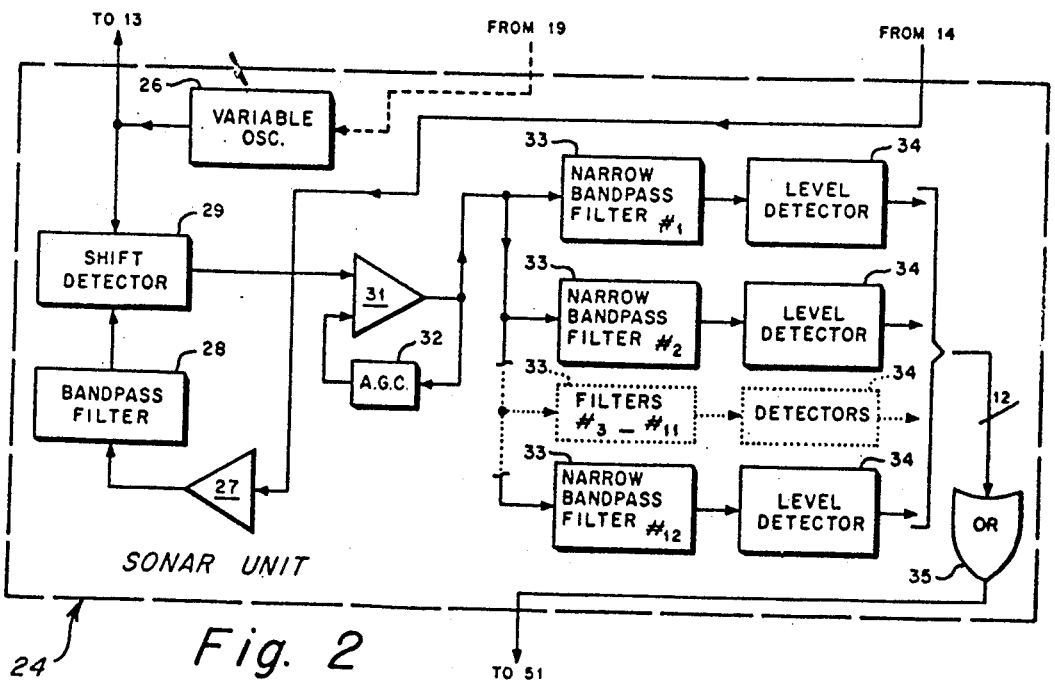
FIG. 2 is a block diagram of a sonar unit of FIG. 1.

Arrays 12 are electrically and mechanically connected to respective sonar units 24a and 24b which are substantially identical and will be referred to generically as unit 24. Frequency control of generator 13 and processing of the output of receiver 14 are performed by unit 24. Referring now to FIG. 2, generator 13 is driven by a variable oscillator 26 providing selected frequencies as a function of the beam angle α or β. The output of receiver 12 is passed via an audio amplifier 27 to a bandpass filter 28 which removes those frequencies which lie outside of the band of reflected frequencies originating from generator 13. The output of filter 28 is fed to a doppler shift detector 29 which is connected to oscillator 26 to utilize the variable, ensonifying, carrier frequency as a reference signal. Detector 29 in effect subtracts the carrier signal from the received signal by allowing the two signals to beat together producing an output which includes the complex doppler shift spectra. The output of detector 29 is applied to a broad bandpass, variable gain-controlled, audio amplifier 31 having an automatic gain control loop 32 which compensates for shifts in the average ambient level throughout all frequencies in the output of detector 29.

The output of amplifier 31 carrying the composite doppler shift frequencies is fed to a plurality of parallel narrow bandpass filters 33 having adjacent bandwidths. For example, filter #1 may have a bandwidth of 5-10 Hz and filter #2 a bandwidth of 10-15 Hz, the amplitudes passed by each filter being down 3 db at the upper and lower ends of the respective bandwidths. The other filters, through filter #12, have successive bandwidths to cover the normal range of doppler frequencies encountered. The output of each filter 33 is passed to a respective level detector 34 which provides an output signal to OR gate 35 when the average amplitude within the corresponding band exceeds a predetermined alarm level. Gate 35 provides a selected output voltage whenever the average amplitude within at least one filtered band exceeds the alarm level.

A suitable device for level detector 34 would be a meter having a pointer whose deflection is proportional to the average amplitude and an engageable contact located in the path of the pointer at a position corresponding to the predetermined level. Engagement of the contact by the pointer would complete an electrical circuit thereby providing an output signal to OR gate 35.

The frequency of the signal applied to rotating generator 13 is varied to compensate for the effects of rotation. It has been found that the doppler frequency may be made independent of the angular orientation of the beam relative to the current by providing a transmitted frequency equal to a selected constant frequency $f_o$ multiplied by the secant of the angle θ. A suitable mechanical connection between each table 15 and unit 24 supplies the bearing angle α or β. There are numerous devices available, such as programmable oscillators, which are capable of varying an output frequency in accordance with sec θ.

Figure 3:
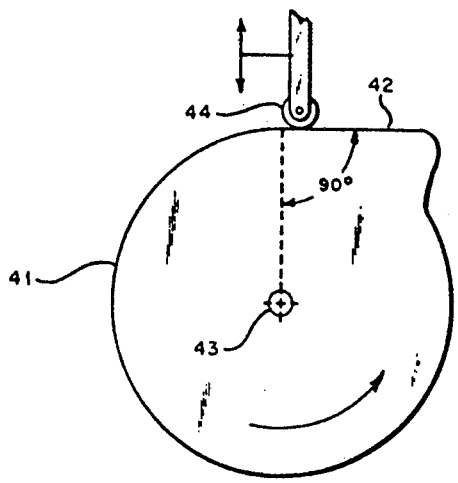
FIG. 3 is a side view of a cam arrangement.

FIG. 3 shows a suitable cam mechanism 41 having a rectilinar cam surface 42 perpendicular to a radius extending from rotational axis 43. Cam 41 would be appropriately connected to table 15 for slaved rotation. A cam follower 44 rides surface 42 undergoing upward, linear motion when cam 41 rotates counterclockwise. Follower 44 is displaced proportionally to the secant of the angle through which cam 41 is rotated. A linear potentiometer or other linear frequency-varying means on oscillator 26 would be operated by follower 44 to provide the desired transmitted frequency, $f_o$·sec θ.

The outputs of OR gates 35 in sonar units 24 and 24b are fed to a control circuit 51 (FIG. 1) receiving mechanical inputs from tables 15 to control the operation of slewing drive units 19a and 19b in response to certain detection criteria. The function of control circuit 51 is generally to adjust the beam angles α or β following an initial detection of a target so that the target will remain within a volume common to beams A and B allowing accurate determination of the target coordinates.

Figure 4:
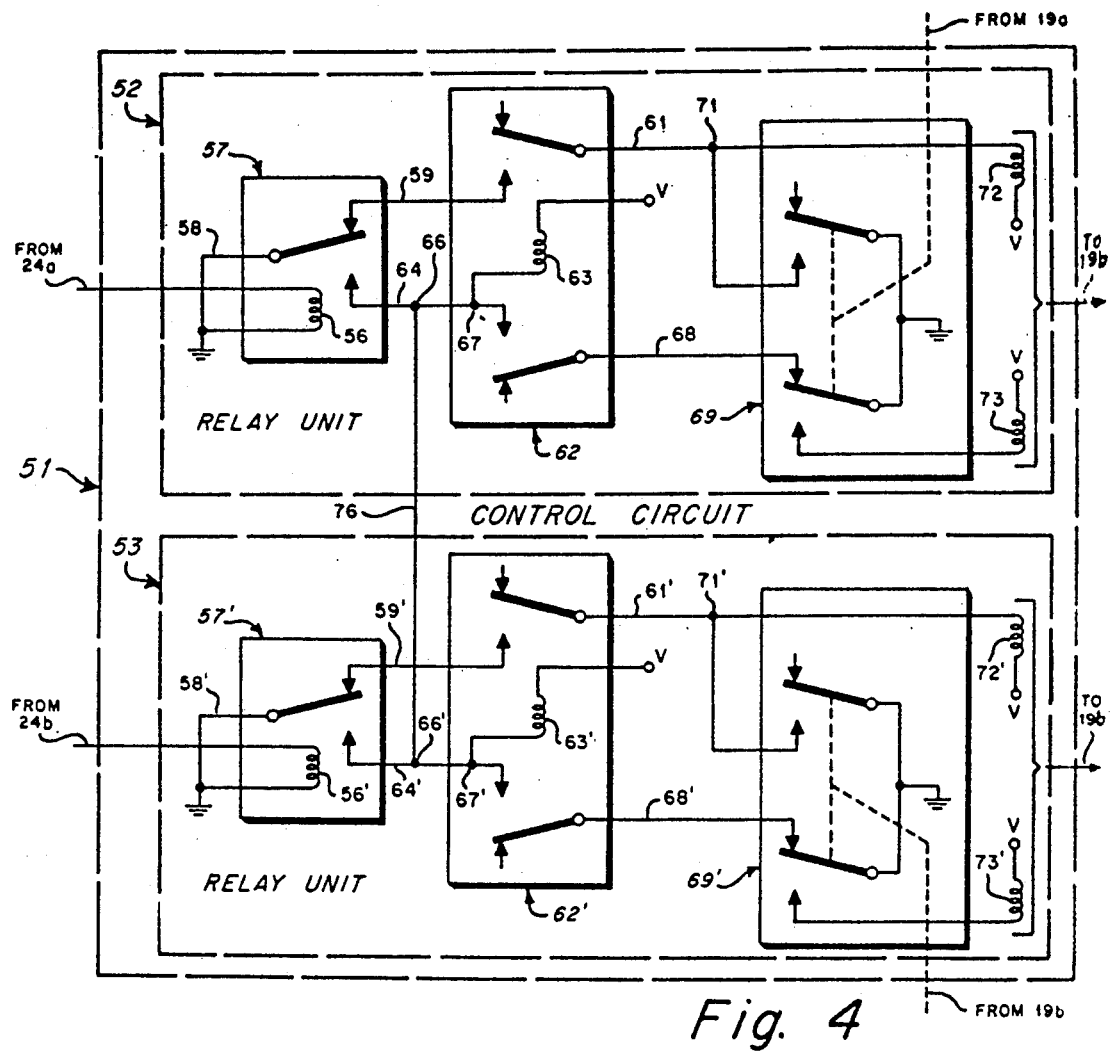
FIG. 4 is a schematic diagram of a control circuit of FIG. 1.

FIG. 4 shows a suitable relay circuit to implement control circuit 51. Two substantially identical relay units 52 and 53 are connected respectively to the outputs of OR gates 35 in sonar units 24a and 24b. A voltage output from unit 24a indicating that a target has been detected energizes a grounded relay coil 56 in a relay switch 57. A grounded line 58 is normally connected through switch 57 to a line 59. Line 59 leads to a relay switch 62 and is connectable to line 61 under the operation of switch 62 when its relay coil 63 is energized. Line 58 is connected to a line 64 which passes through junctions 66 and 67 to one end of coil 63 in relay switch 62. The other end of coil 63 is connected to an appropriate source of AC or DC voltage. Operation of switch 57 energizes switch 62 connecting junction 67 with line 68 which normally passes to ground via a double throw limit switch 69. Line 61 is connected through a junction 71 to one end of a relay coil 72. The other end of coil 72 is connected to an appropriate source of AC or DC voltage. Junction 71 is connectable to ground by operating limit switch 59. One end of a relay coil 73 is similarly connectable by switch 69 to ground. The other end of coil 73 is likewise connected to a source of voltage.

The structure and general operation of relay unit 53 is identical to that of the unit 52, reference numbers 56' to 73' referring to the same items as the corresponding numbers for relay unit 52. A coordinating line 76 joins lines 64 and 64' at respective junctions 66 and 66', allowing operation of switch 62 by switch 57' and similar operation of switch 62' by switch 57.

Limit switches 69 and 69' are mechanically connected to drive units 19a and 19b respectively such that when beam axis 23a, for example, is rotated through 0° relative to the current, switch 69 is thrown and locks connecting junction 71 and coil 73 to ground. Switch 69 resumes its normal position when beam axis 23a passes through the 45° position. Switch 69' operates in a similar manner in response to the orientation of beam axis 23b.

Figure 5:
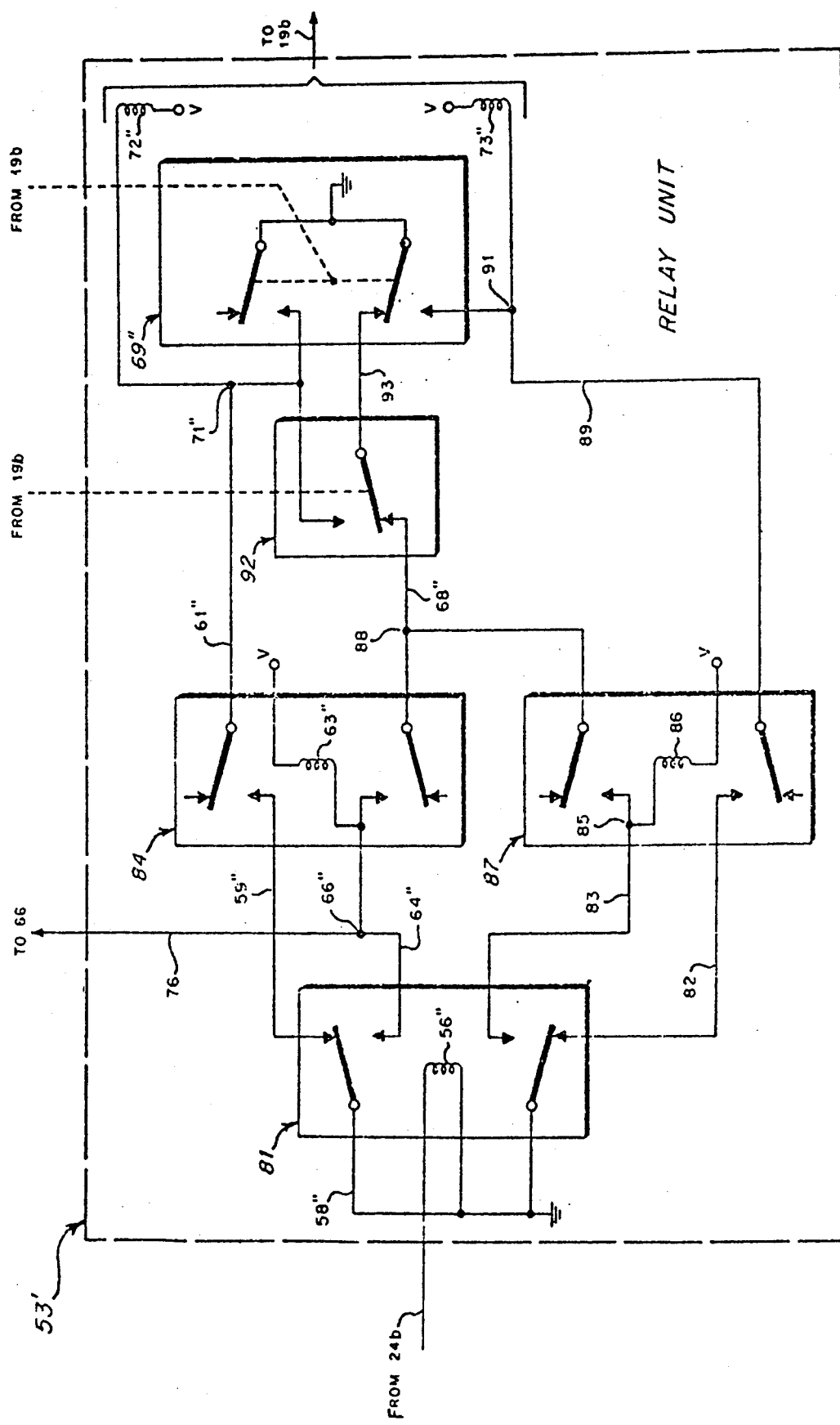
FIG. 5 is a schematic diagram of another embodiment of a relay unit of FIG. 4.

Another embodiment of relay unit 53 is shown in FIG. 5. Grounded line 58" is normally connected to line 59" through relay switch 81 including a coil 56" corresponding to coil 56' in FIG. 4. Grounded line 58" is also normally connected through switch 81 to line 82. Upon energizing coil 56", line 64" and 83 are connected to grounded line 58". Line 64" is connected via junction 66" to one end of coil 63" in a relay switch 84. The other end of coil 63" is connected to a source of voltage. Junction 66" is connected via coordinating line 76 to junction 66 of relay unit 52 in FIG. 4. Line 83 is connected through a junction 85 to one end of a coil 86 in another relay switch 87. The other end of coil 86 is connected to a source of voltage. Upon operation of switch 87, junction 85 is connected to a junction 88 in a line 68" connectable to line 64" by operation of switch 84. Operation of switch 87 also connects line 82 to line 89 which passes through a junction 91 to one end of a coil 73" whose other end is connected to a source of voltage. Line 68" is normally connected through micro-switch 92 to line 93 which is normally connected to ground by limit switch 69". Upon the operation of switch 84, line 59" is connected to a line 61" which passes through a junction 71" to one end of a coil 72" whose other end is connected to a source of voltage. Junction 71" is connected to switches 92 and 69". Nonlocking micro-switch 92 is mechanically connected to drive unit 19b and operates momentarily when beam axis 23b passes through the 45° position. When switch 92 is operated, junction 71" is connected to line 93. Limit switch 69" is mechanically connected to drive unit 19b and operates in a manner identical to that of limit switch 69' of FIG. 4. When switch 69" is operated, junction 71" and junction 91 are connected to ground.

OPERATION

Several preliminary steps must be taken to prepare the equipment for actual operation. First, the length of beams A and B and the longitudinal separation of arrays 12 must be adjusted so that beams A and B overlap slightly at their distal ends and terminate approximately at the opposite bank 11 of river 10 (FIG. 1). Gaps between proximate beam ends and arrays improve the signal-to-noise ratio. Fortuitous side lobes provide ample gap coverage. Second, beams A and B must be given their initial orientation of 45° with respect to the prevailing current. Third, the transmitted frequency ranges for transducer arrays 12a and 12b must be established. A suitable frequency range applied by oscillator 26 of sonar unit 24a to transducer array 12a would be 30 to 42 kHz. To avoid interference, the range for array 12b would be distinct, typically 45 to 63 kHz. Other frequency ranges could be established by selecting appropriate values of $f_o$ where the transmitted frequency is $f_o \cdot \sec \theta$. Fourth, level detectors 34 in both sonar units 24a and 24b must be adjusted in accordance with the ambient doppler spectra introduced by the river current. The alarm level for each filtered band should represent approximately the same proportionate increase over the ambient level within each band.

Referring to FIG. 4, relay coils 72 and 73 perform the necessary switching to reverse an ordinary reversible electrical motor which serves as drive unit 19a and will be referred to as A motor. A similar B motor serves as the drive unit 19b. A motor normally rotates counterclockwise while B motor normally rotates clockwise. For illustration, the A motor will be assumed to be on and rotating counterclockwise whenever coil 72 is energized and rotating clockwise when both coils 72 and 73 are energized. The B motor would be similarly operable in the opposite directions by coils 72' and 73' or 72" and 73" (FIG. 5). The selection and conventional arrangement within the detection system of appropriate motors and linkages are recognized to be well within the ordinary skill of those practicing the art.

In actual operation, a target floating downstream first enters the guarded volume of beam A. The output amplitude of the filter handling the doppler shift frequency associated with the velocity of the target rises to the alarm level, and the output of OR gate 35 is activated producing an output from sonar unit 24a to control circuit 51. Switch 57 is operated which, in turn, operates switch 62. The A motor coil 72 is not energized, however, since lines 58 and 59 are disconnected. Nevertheless, coordinating line 76 is grounded thus operating switch 62' in relay unit 53. Coil 72' is energized since lines 58, 59' and 61' are connected. Accordingly, the B motor rotates beam B in the clockwise direction. When beam B envelops the target, sonar unit 24b sends a detection signal to relay unit 53 and switch 57' operates to open the electrical circuit of coil 72' stopping the B motor. As the target continues its course, it will eventually move out of beam A deactivating switch 57 of relay unit 52. At initial detection by beam A, switches 62 and 62' were locked in the activated condition by means of grounded lines 68 and 68', respectively. Thus, subsequent target loss by beam A closes the circuit of coil 72, lines 58, 59 and 61 being connected. Consequently, A motor will cause counterclockwise rotation of beam A until the target is reacquired at which time switch 57 will operate to open the circuit of A motor coil 72. If beam A were to reach the end of its excursion limit ($\alpha = 0°$) without reacquiring the target, limit switch 69 would be locked to its alternate position. Any conventional arrangement would be permissible for switch 69. For example, a double throw toggle switch engaged by a passing member linked to table 15 would suffice. In the alternate position, limit switch 69 completes the circuits for both A motor coils 72 and 73 causing clockwise rotation back to the other limit, $\alpha = 45°$, whereupon switch 69 resumes the normal position. The functional description of switch 69 applies equally to switch 69' of relay unit 53 and switch 69" of FIG. 5. If the alarm associated with beam B were still present, of course, A motor would then rotate again in the counterclockwise direction.

On the other hand, if beam B loses the target, switch 57' will be deactivated closing the coil 72' circuit and causing clockwise rotation of beam B. If the target has continued its downstream course, beam B would rotate to $\beta = 0°$ without reacquisition. At this point, limit switch 69' will cause counterclockwise rotation back to the original 45° orientation where switch 69' will resume its normal position. If beam A still detects the target, beam B will rotate clockwise until it reaquires the target unless, of course, the target has moved out of range of beam B.

If desired, the motion of Beam B can be minimized by substituting the circuit of relay unit 53' (FIG. 5) for that of unit 53 (FIG. 4). The added circuitry of FIG. 5 concerns primarily the addition of relay switch 87 and nonlocking micro-switch 92. Following detection by beam A, when beam B first detects the target, switch 81 will operate to energize coil 86 of switch 87 which is self-locking by means of the contact at junction 85 on coil line 83. Like switch 57' of FIG. 4, however, switch 81 (FIG. 5) opens the B motor coil 72" circuit preventing further clockwise rotation. When beam B loses the target, the B motor causes immediate counterclockwise rotation unlike unit 53 (FIG. 4). Due to locked switch 87, both coils 73" and 72" will be operated when switch 81 resumes the normal position at the time of target loss. In this arrangement, beam B may never have to go through the full excursion to $\beta = 0°$. Thus in normal operation, limit switch 69" might not be thrown. A means of releasing relay switches 84 and 87 is thus provided by nonlocking micro-switch 92 which operates momentarily when the $\beta = 45°$ point is reached and slighly exceeded to open the relay coil circuits and allow switches 84 and 87 to return to normal. Any suitable cam mechanism can be used to control the operation of switch 92 so that it is operated only during the momentary 45° overrun and return of B motor. At the same time coil 72″ is energized causing clockwise rotation. Micro-switch 92 returns to normal when beam B passes the 45° point rotating in the clockwise direction.

To summarize the operation, using the circuit of FIG. 5 in combination with relay unit 52 of FIG. 4, the typical sequence of steps for a target moving continuously downstream will be as follows: (1) detection by beam A; (2) clockwise rotation of beam B; (3) detection by beam B; (4) target loss by beam A; (5) counterclockwise rotation by beam A; (6) reacquisition by beam A; (7) target loss by beam B; (8) counterclockwise rotation by beam B; and (9) reacquisition by beam B. The system will continue to follow the target in a similar fashion until the target is out of range. If, by chance, the target is first detected by beam B instead of beam A, A motor will rotate beam A clockwise to acquire the target since coordinating line 76 will operate switch 62 (FIG. 4) energizing A motor coil 72.

Any conventional means of providing a display of the beam angles α and β can be used. For example, a pair of master-slave, synchro-transmitting devices would be suitable. The slaved synchro would operate a pointer in a suitably calibrated meter. If the location of the array 12 producing beam A is chosen as a reference, the bearing of the target would be α and the range would be computed from the formula $$R = d[\sin \beta / \sin (\alpha + \beta)],$$

where d is the longitudinal separation between arrays 12.

The function of relay units 52 and 53 or 53′ can be performed by equivalent structure; the circuits of FIGS. 4 and 5 are intended only for illustration. The criteria for the first activation of drive unit 19b is target detection by beam A but not by beam B. This function may be implemented, for example, by a conventional logic AND gate, one input being "A" and the other input being "NOT B" produced by a simple inversion of the output of sonar unit 24b. For the other operations of FIGS. 4 and 5, similar equivalent circuits using the components of logic design can be developed by those skilled in the art.

Drive units 19a and 19b are not confined to reversible electric motors but may comprise any suitable means for causing reciprocating slewing of arrays 12 through predetermined angles. The rate and continuity of rotation once begun is not a critical factor and is limited only by the extent to which the quality of the received doppler shifted frequecies may be degraded by rapid slewing.

The normal 45° orientation of beams A and B is a typical arrangement used for illustration. Other normal orientations are possible. However, the transmitted frequency range becomes prohibitive as the angle α or β approaches 90° where the perpendicular velocity component would approach zero. Arrays 12 need not be implanted in the side of river 10 although this arrangement has been found to be preferable since target objects normally are near the surface. So long as arrays 12 are longitudinally spaced with respect to the primary current, they may be located at other points along the river bottom.

If the target tracking capability is not considered necessary for a particular application, beam A would not have to be rotatable. The modified system would still yield one set of target coordinates. Upon initial detection by fixed beam A, beam B would be slewed clockwise to acquire the target. The simplified control circuit could use a single AND gate. One input would be the alarm signal from sonar unit 24a and the other would be the inverted signal from unit 24b. Thus, the criteria for slewing beam 13 would be detection by "A, but not B". When beam B acquired the target, coincidence would be destroyed stopping rotation.

Among the numerous advantages achieved by the improved detection system of FIG. 1 is the provision of a tracking doppler sonar apparatus allowing continuous update of target coordinates. In addition, the utilization of two separate sonar detection beams provides a redundant or backup system which would insure detection of a target even though one of the sonar beams was disabled. Moreover, a means has been found for making the doppler shifted frequency independent of the angle of a sonar beam relative to the primary current.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. An object detection system for a desired surveillance region, comprising:

first and second scanning arrays spatially disposed along a first boundary and pivotal in a plane within the surveillance region, each array including a transmitter for generating respective first and second finite beams defining second and third boundaries of the surveillance region and a receiver for accepting the respective reflected signals, said arrays being positioned such that the beams can overlap intermediate said arrays and laterally displaced from the first boundary;

first and second threshold means connected respectively to said first and second arrays receiving the outputs of said receivers for providing first and second alarm output signals when an object is present within said first or second beam respectively;

first and second control means respectively connected to said first and second threshold means for producing a first control signal output when an object is present within said second beam and absent within said first beam, and a second control signal output when an object is present within said first beam and absent within said second beam; and first and second drive means operatively connected between said first and second control means and said first and second arrays respectively for rotating said first array in the presence of the first control signal and said second array in the presence of the second control signal.

2. The detection system according to claim 1 wherein:

said first and second threshold means each include an oscillator connected to said transmitters and providing an output for modulating the transmitted signal, shift detector means operatively connected to said receivers and said oscillator to compare the frequencies of the transmitted and received signals for producing an output indicative of a doppler shift, at least one bandpass filter operatively connected to said shift detector for passing a selected bandwidth of said shift detector output, and at least one level detector connected to receive the output of the corresponding filter for producing respectively the first and second alarm signals when said filter output exceeds a a predetermined level.

3. The detection system of claim 2 wherein:

each said threshold means further comprises means connected respectively between said oscillator and said first and second array for varying the frequency of said oscillator in proportion to the secant of the angles through which said first and second arrays respectively are rotated.

4. The detection system according to claim 3, wherein:

said first control means comprises first means connected to receive the first alarm signal having first and second outputs energized respectively in the presence and absence of the first alarm signal, first gate means having a first input connected to said first means second output and having a second input operatively connected to said first means first output for providing the first control signal output to said first array first drive means when the first gate means first and second inputs are simultaneously energized, and first self-locking means connected to said first gate means second input for maintaining energization thereof once initiated; and said second control means comprises second means connected to receive the second alarm signal having first and second outputs energized resepectively in the presence and absence of the second alarm signal, second gate means having a first input connected to said second means second output and having a second input operatively connected to said first and second means first outputs for providing the second control signal output to said second array second drive means when said second gate means first and second inputs are simultaneously energized, said first gate means second input being operatively connected to said second means first output, and second self-locking means connected to said second gate means second input for maintaining energization thereof once initiated.

5. Doppler sonar detection apparatus of the type comprising an acoustic generator, an acoustic receiver, a doppler shift detector which compares the frequency of the received signal with that of the generated signal and produces an output indicative of the doppler shift, at least one narrow bandpass filter operatively connected to the shift detector for passing a selected bandwidth of the shift detector output, and at least one level detector connected to receive the corresponding filter output and producing a detection signal when the filter output exceeds a predetermined level, wherein the improvement comprises:

a rotatable support on which the generator and receiver are mounted to establish a slewable radial beam;

drive means operatively connected to said support for rotating said support;

a variable frequency oscillator operatively connected to the generator and the shift detector to provide an output of varying frequency for modulating the generated signal and serving as a reference signal for the shift detector; and means connected between said support and said oscillator for varying the frequency of said oscillator output in proportion to the secant of the angle through which said support is rotated.

* * * * *